United States Patent
Zoller et al.

(10) Patent No.: US 11,735,157 B2
(45) Date of Patent: *Aug. 22, 2023

(54) SYSTEMS AND METHODS FOR PROVIDING AUTOMATED NATURAL LANGUAGE DIALOGUE WITH CUSTOMERS

(71) Applicant: Capital One Services, LLC, McLean, VA (US)

(72) Inventors: Gregory W. Zoller, Coppell, TX (US); Scott Karp, Leesburg, VA (US); Sujay Eliphaz Jacob, Ashburn, VA (US); Erik Mueller, Chevy Chase, MD (US); Stephanie Hay, Falls Church, VA (US); Adam Roy Paynter, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 159 days.

This patent is subject to a terminal disclaimer.

(21) Appl. No.: 17/245,109

(22) Filed: Apr. 30, 2021

(65) Prior Publication Data
US 2021/0248993 A1    Aug. 12, 2021

Related U.S. Application Data

(63) Continuation of application No. 16/807,192, filed on Mar. 3, 2020, now Pat. No. 11,004,440, which is a
(Continued)

(51) Int. Cl.
*G10L 13/027* (2013.01)
*G06Q 50/00* (2012.01)
(Continued)

(52) U.S. Cl.
CPC ............ *G10L 13/027* (2013.01); *G06F 9/542* (2013.01); *G06F 40/284* (2020.01); *G06F 40/35* (2020.01);
(Continued)

(58) Field of Classification Search
CPC ....... G10L 13/027; G10L 13/00; G10L 15/26; G06N 20/00; G06N 5/046; G06F 40/35;
(Continued)

(56) References Cited

U.S. PATENT DOCUMENTS 8,687,777 B1 *   4/2014   Lavian ................. H04M 3/493
                                                               704/270.1
9,318,108 B2 *   4/2016   Gruber ................ G06F 16/3329
(Continued)

FOREIGN PATENT DOCUMENTS

WO          0104876 A1      1/2001

OTHER PUBLICATIONS

Extended European Search Report in related EP Application No. 18157120.9, dated Jul. 24, 2018.
(Continued)

*Primary Examiner* — Michael Colucci
(74) *Attorney, Agent, or Firm* — Troutman Pepper Hamilton Sanders LLP; Christopher J. Forstner; John A. Morrissett

(57) ABSTRACT

A system includes one or more memory devices storing instructions, and one or more processors configured to execute the instructions to perform steps of providing automated natural dialogue with a customer. The system may generate one or more events and commands temporarily stored in queues to be processed by one or more of a dialogue management device, an API server, and an NLP device. The dialogue management device may create adaptive responses to customer communications using a customer context, a rules-based platform, and a trained machine learning model.

20 Claims, 5 Drawing Sheets

Related U.S. Application Data continuation of application No. 16/427,965, filed on May 31, 2019, now Pat. No. 10,614,793, which is a continuation of application No. 15/665,960, filed on Aug. 1, 2017, now Pat. No. 10,332,505.

(60) Provisional application No. 62/469,193, filed on Mar. 9, 2017.

(51) Int. Cl.

| | |
|---|---|
| *G06Q 30/016* | (2023.01) |
| *G06N 5/046* | (2023.01) |
| *H04L 51/02* | (2022.01) |
| *G06N 20/00* | (2019.01) |
| *G06F 9/54* | (2006.01) |
| *G06F 40/35* | (2020.01) |
| *G06F 40/284* | (2020.01) |
| *G10L 13/00* | (2006.01) |
| *G10L 15/26* | (2006.01) |
| *G10L 15/22* | (2006.01) |

(52) U.S. Cl.
CPC ............. *G06N 5/046* (2013.01); *G06N 20/00* (2019.01); *G06Q 30/016* (2013.01); *G06Q 50/01* (2013.01); *G10L 13/00* (2013.01); *G10L 15/26* (2013.01); *H04L 51/02* (2013.01); *G10L 15/22* (2013.01); *G10L 2015/223* (2013.01)

(58) Field of Classification Search
CPC ..... G06F 40/284; G06F 9/542; G06Q 30/016; G06Q 50/01; H04L 51/02
See application file for complete search history.

(56) References Cited

U.S. PATENT DOCUMENTS

| | | | | |
|---|---|---|---|---|
| 9,508,339 | B2* | 11/2016 | Kannan | G10L 15/005 |
| 9,582,608 | B2* | 2/2017 | Bellegarda | G06F 16/90324 |
| 10,170,106 | B2* | 1/2019 | Gelfenbeyn | G10L 15/08 |
| 2002/0091528 | A1* | 7/2002 | Daragosh | G10L 15/30 |
| | | | | 704/E15.047 |
| 2007/0106568 | A1* | 5/2007 | Asher | G06Q 30/0635 |
| | | | | 705/26.81 |
| 2009/0099965 | A1* | 4/2009 | Grant, IV | G06Q 40/00 |
| | | | | 705/41 |
| 2010/0023329 | A1* | 1/2010 | Onishi | G10L 15/07 |
| | | | | 704/E15.001 |
| 2011/0060587 | A1* | 3/2011 | Phillips | G10L 15/30 |
| | | | | 704/235 |
| 2014/0136194 | A1* | 5/2014 | Warford | G10L 25/51 |
| | | | | 704/233 |
| 2014/0297282 | A1* | 10/2014 | Peters | G10L 15/19 |
| | | | | 704/254 |
| 2014/0365226 | A1* | 12/2014 | Sinha | G10L 15/22 |
| | | | | 704/275 |
| 2015/0058006 | A1* | 2/2015 | Proux | G10L 15/26 |
| | | | | 704/235 |
| 2015/0066503 | A1* | 3/2015 | Achituv | G10L 15/197 |
| | | | | 704/235 |
| 2016/0012465 | A1* | 1/2016 | Sharp | G06Q 20/321 |
| | | | | 705/14.17 |
| 2016/0098992 | A1 | 4/2016 | Renard et al. | |
| 2016/0219048 | A1* | 7/2016 | Porras | H04L 63/20 |
| 2016/0259775 | A1 | 9/2016 | Gelfenbeyn et al. | |
| 2017/0323345 | A1* | 11/2017 | Flowers | G06Q 30/0269 |
| 2018/0165061 | A1* | 6/2018 | Nicolich-Henkin | G06F 3/167 |

OTHER PUBLICATIONS

Examination Report in related EP Application No. 18157120.9, dated Sep. 19, 2019.

\* cited by examiner

SYSTEMS AND METHODS FOR PROVIDING AUTOMATED NATURAL LANGUAGE DIALOGUE WITH CUSTOMERS

CROSS-REFERENCE TO RELATED APPLICATIONS

This application is a continuation of, and claims priority under 35 U.S.C. § 120 to, U.S. patent application Ser. No. 16/807,192, filed Mar. 3, 2020, which is a continuation of U.S. patent application Ser. No. 16/427,965, filed May 31, 2019, which is a continuation of U.S. patent application Ser. No. 15/665,960, filed Aug. 1, 2017, now U.S. Pat. No. 10,332,505, which claims the benefit of U.S. Provisional Application No. 62/469,193, filed Mar. 9, 2017, the entire contents and substance of which are hereby fully incorporated herein by reference.

FIELD

The present disclosure relates to systems and methods for providing automated natural language dialogue, and more particularly providing systems and methods to modify and adapt responses to customers based on the development of the customer context for a particular customer.

BACKGROUND

Automated systems for interacting with customers, such as interactive voice response (IVR) systems or programs that generate automatic written, auditory, or video responses via web and mobile device application channels are useful ways to provide customers with requested information and perform routine account actions (e.g., checking an account balance, submitting a payment, closing an account, etc.) in an expedited, extended hours fashion without the need to have a large workforce of customer service agents. While helpful, existing systems tend to provide an impersonal and robotic user experience limited by scripted questions and responses with a finite number of permutations that are used for every customer. Additionally, these systems are typically unable to personalize the user experience based on a customer's history with the company or organization affiliated with the system.

Accordingly, there is a need for improved systems and methods to provide automated natural language dialogue with intelligent, adaptive responses that are personalized to a customer's particular history. Embodiments of the present disclosure are directed to this and other considerations.

BRIEF SUMMARY

Disclosed embodiments provide systems and methods for providing automated natural language dialogue.

Consistent with the disclosed embodiments, the system may include one or more memory devices storing instructions, and one or more processors configured to execute the instructions to perform steps of a method to provide automated natural language dialogue. The system may execute the instructions to receive a first event to be placed in an event queue that is monitored by a dialogue management device that includes a rules-based platform, a trained machine learning module, and a customer context. In response to detecting the first event in the event queue, the dialogue management device may receive the first event from the event queue. The dialogue management device may then process the first event and generate a first command to be placed in the command queue based on one or more of the rules-based platform, the trained machine learning model, and the customer context. The command queue includes one or more commands for execution by one or more of a natural language processing device, an API server, and a communication interface and upon execution of the first command by one of these entities, a second event may be generated to be placed in the event queue. The dialogue management device may then detect and receive the second event from the event queue. Upon processing the second event, the dialogue management device may then generate a response dialogue message and a second command to be placed in the command queue based on one or more of the rules-based platform, the trained machine learning model, and the customer context. The second command may provide an instruction to the communication interface to transmit the response dialogue message.

Consistent with the disclosed embodiments, methods for providing automated natural language dialogue are also disclosed.

Further features of the disclosed design, and the advantages offered thereby are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
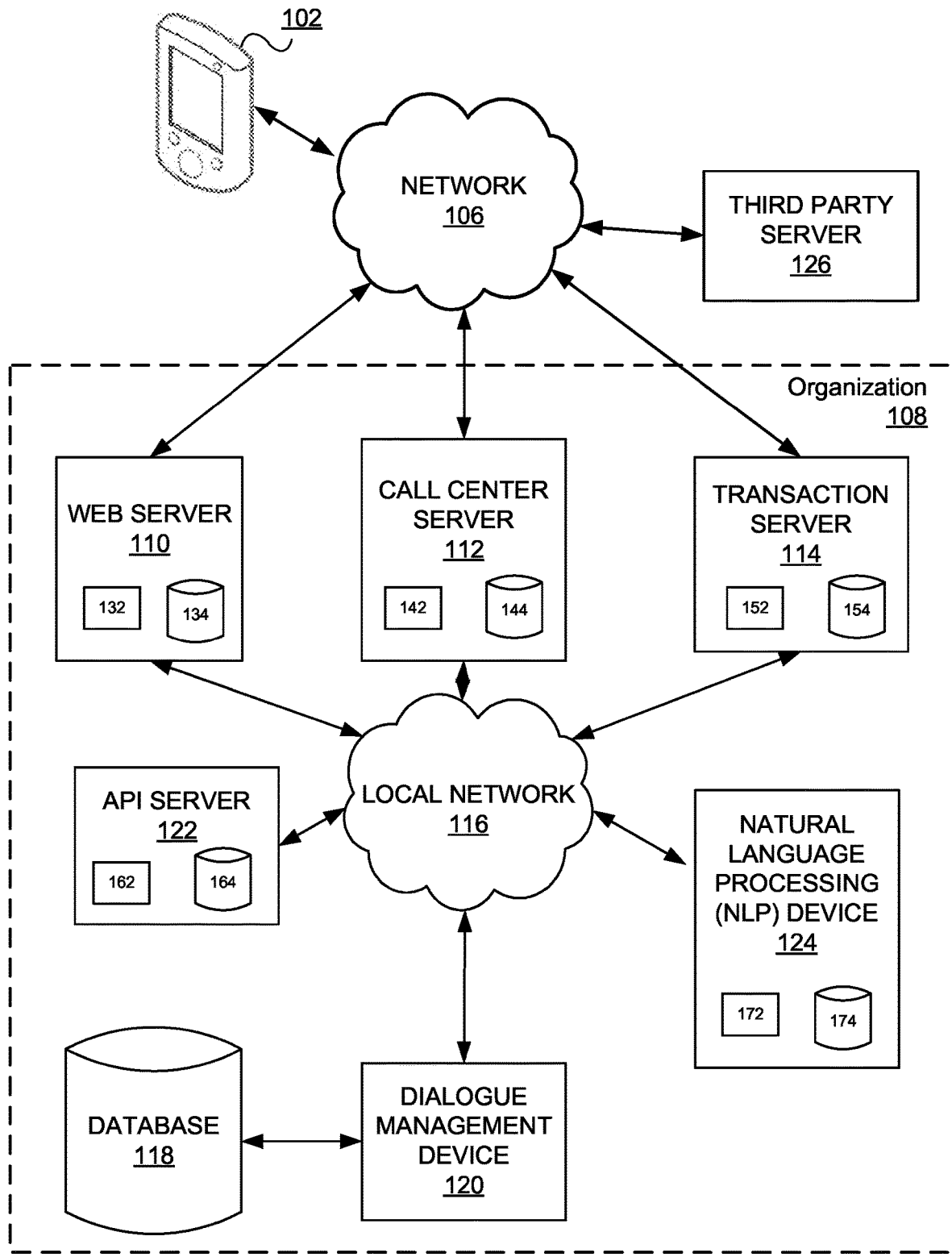
FIG. 1 is a diagram of an exemplary system that may be used to automated natural language dialogue.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing automated natural language dialogue. The system may include one or more memory devices storing instructions, and one or more processors configured to execute the instructions to perform steps of a method. Specifically, in some embodiments, the system may provide automated natural language responses to customer messages across multiple different communication channels. To accomplish this, the system may execute the instructions to generate a first event to be placed in an event queue in response to receiving an incoming customer dialogue message, where the event queue is monitored by a dialogue management device that includes a rules-based platform, a trained machine learning module, and a customer context. In response to detecting the first event in the event queue, the dialogue management device may receive the first event from the event queue. The dialogue management device may then process the first event and generate a first command to be placed in the command queue based on one or more of the rules-based platform, the trained machine learning model, and the customer context, where the first command represents a command to the natural language processing device to determine the meaning of the incoming customer dialogue message. The command queue may include one or more commands for execution by one or more of a natural language processing device, an API server, and a communication interface and upon execution of the first command by the natural language processing device, a second event may be generated to be placed in the event queue, where the second event may represent a determined meaning of the incoming customer dialogue message. The dialogue management device may then detect and receive the second event from the event queue. Upon processing the second event, the dialogue management device may then generate a second command to be placed in the command queue, by the dialog management device and based on one or more of the rules-based platform, the trained machine learning model, and the customer context, where the second command may be a command to the API server to retrieve customer data. Upon execution of the second command by the API server, a third event may be generated to be placed in the event queue, where the third event may represent retrieved customer data. The dialogue management device may then detect and receive the third event from the event queue. Upon processing the third event, the dialogue management device may then generate a response dialogue message and a third command to be placed in the command queue based on one or more of the rules-based platform, the trained machine learning model, and the customer context, wherein the third command may provide an instruction to the communication interface to transmit the response dialogue message.

In another embodiment, a system for providing automated natural language dialogue may include one or more memory devices storing instructions, and one or more processors configured to execute the instructions to perform steps of a method. Upon executing the instructions, the system may receive a first event to be placed in an event queue that is monitored by a dialogue management device that includes a rules-based platform, a trained machine learning module, and a customer context. In response to detecting the first event in the event queue, the dialogue management device may receive the first event from the event queue. The dialogue management device may then process the first event and generate a first command to be placed in the command queue based on one or more of the rules-based platform, the trained machine learning model, and the customer context. The command queue includes one or more commands for execution by one or more of a natural language processing device, an API server, and a communication interface and upon execution of the first command by one of these entities, a second event may be generated to be placed in the event queue. The dialogue management device may then detect and receive the second event from the event queue. Upon processing the second event, the dialogue management device may then generate a response dialogue message and a second command to be placed in the command queue based on one or more of the rules-based platform, the trained machine learning model, and the customer context. The second command may provide an instruction to the communication interface to transmit the response dialogue message.

In another embodiment, a method for providing automated natural language dialogue with a customer may include receiving a first event to be placed in an event queue that is monitored by a dialogue management device that includes a rules-based platform, a trained machine learning module, and a customer context. The method may further include receiving, at the dialogue management device, the first event from the event queue in response to detecting the first event in the event queue. The method may further include generating a first command to be placed in a command queue by the dialog management device and based on one or more of the rules-based platform, the trained machine learning model, and the customer context and in response to processing the first event, where the command queue may comprise one or more commands for execution by one or more of a natural language processing device, an API server, and a communication interface. The method may further include generating a second event to be placed in the event queue in response to execution of the first command by one of a natural language processing device or the API server. The method may further include receiving the second event from the event queue at the dialogue management system in response to detecting the second event in the event queue. Finally, the method may further include generating a response dialogue message and a second command to be placed in the command queue by the dialogue management device in response to processing the second event and based on one or more of the rules-based platform, the trained machine learning model, and the customer context, where the second command may provide an instruction to the communication interface to transmit the response dialogue message.

Although the above embodiments are described with respect to systems, it is contemplated that embodiments with identical or substantially similar features may alternatively be implemented as methods and/or non-transitory computer-readable media.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that can provide automated natural language dialogue that may adaptively respond to customer messages based on an ever-evolving customer context associated with a particular customer. The components and arrangements shown in FIG. 1 are not intended to limit the disclosed embodiments as the components used to implement the disclosed processes and features may vary. As shown, system 100 may include a user device 102, a network 106, and an organization 108 including, for example, a web server 110, a call center server 112, a transaction server 114, a local network 116, a dialogue management device 120, a database 118, an API server 122, and a natural language processing device 124 (which may be referred to herein as an NLP device).

In some embodiments, a customer may operate user device 102. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. In some embodiments, a user device may include or incorporate electronic communication devices for hearing or vision impaired users. User device 102 may belong to or be provided by a customer or may be borrowed, rented, or shared. Customers may include individuals such as, for example, subscribers, clients, prospective clients, or customers of an entity associated with organization 108, such as individuals who have obtained, will obtain, or may obtain a product, service, or consultation from an entity associated with organization 108. According to some embodiments, user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Third party server 126 may comprise a computer system associated with an entity other than the entity associated with organization 108 and customers that perform one or more functions associated with the individual and organization 108. For example, third party server 126 can comprise an automated teller machine (ATM) system that allows the customer to withdraw money from an account managed via organization 108. As another example, third party server 126 may comprise a server associated with a store where the customer intends to make a purchase using funds held in an account that an entity associated with organization 108 manages. As another example, third party server 126 may comprise a computer system associated with a product repair service that submits a warranty claim for a product that customer purchased from the entity associated with organization 108.

Organization 108 may be associated with and optionally controlled by an entity such as a business, corporation, individual, partnership, or any other entity that provides one or more of goods, services, and consultations to individuals such as customers.

Organization 108 may include one or more servers and computer systems for performing one or more functions associated with products and/or services that organization 108 provides. Such servers and computer systems may include, for example, web server 110, call center server 112, and/or transaction server 114, as well as any other computer systems necessary to accomplish tasks associated with organization 108 or the needs of customers (which may be customers of the entity associated with organization 108). Web server 110 may include a computer system configured to generate and provide one or more websites accessible to customers, as well as any other individuals involved in organization 108's normal operations. Web server 110 may include a computer system configured to receive communications from a user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices (e.g., the dialogue management device 120) of system 100. In some embodiments, processor 132 may be used to implement an automated natural language dialogue system that may interact with a customer via different types of communication channels such as a website, mobile application, instant messaging application, SMS message, email, or any other type of electronic communication. When receiving an incoming message from, for example, a user device 102 of a customer, web server 110 may be configured to determine the type of communication channel user device 102 used to generate the incoming message.

Call center server 112 may include a computer system configured to receive, process, and route telephone calls and other electronic communications between a customer operating user device 102 and the dialogue management device 120. Call center server 112 may have one or more processors 142 and one or more call center databases 144, which may be any suitable repository of call center data. Information stored in a call center server 112 may be accessed (e.g., retrieved, updated, and added to) via local network 116 and/or network 106 by one or more devices (e.g., the dialogue management device 120) of system 100. In some embodiments, call center server processor 142 may be used to implement an interactive voice response (IVR) system that interacts with the customer over the phone.

Transaction server 114 may include a computer system configured to process one or more transactions involving an account associated with customers, or a request received from customers. In some embodiments, transactions can include, for example, a product/service purchase, product/ service return, financial transfer, financial deposit, financial withdrawal, financial credit, financial debit, dispute request, warranty coverage request, and any other type of transaction associated with the products and/or services that an entity associated with organization 108 provides to individuals such as customers. Transaction server 110 may have one or more processors 152 and one or more transaction server databases 154, which may be any suitable repository of transaction data. Information stored in transaction server 110 may be accessed (e.g., retrieved, updated, and added to) via local network 116 and/or network 106 by one or more devices (e.g., the dialogue management device 120) of system 100.

In some embodiments, transaction server 114 tracks and stores event data regarding interactions between a third party, such as third-party server 126, with organization 108, on behalf of the individual. For example, transaction server 114 may track third-party interactions such as purchase requests, refund requests, warranty claims, account withdrawals and deposits, and any other type of interaction that third party server 126 may conduct with organization 108 on behalf of an individual such as a customer.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 208 may communicate via network 106, without a separate local network 116.

Dialogue management device 120 may comprise one or more computer systems configured to compile data from a plurality of sources, such as web server 110, call center server 112, and transaction server 114, correlate compiled data, analyze the compiled data, arrange the compiled data, generate derived data based on the compiled data, and storing the compiled and derived in a database such as database 118. According to some embodiments, database 118 may be a database associated with organization 108 and/or its related entity that stores a variety of information relating to customers, transactions, and business operations. Database 118 may also serve as a back-up storage device and may contain data and information that is also stored on, for example, databases 134, 144, 154, 164, 174 and 280. Database 118 may be accessed by dialogue management device 120 and may be used to store records of every interaction, communication, and/or transaction a particular customer has had with organization 108 and/or its related entity in the past to enable the creation of an ever-evolving customer context that may enable dialogue management device 120 to provide customized and adaptive dialogue when interacting with the customer.

API server 122 may include a computer system configured to execute one or more application program interfaces (APIs) that provide various functionalities related to the operations of organization 108. In some embodiments, API server 122 may include API adapters that enable the API server 122 to interface with and utilize enterprise APIs maintained by organization 108 and/or an associated entity that may be housed on other systems or devices. In some embodiments, APIs can provide functions that include, for example, retrieving customer account information, modifying customer account information, executing a transaction related to an account, scheduling a payment, authenticating a customer, updating a customer account to opt-in or opt-out of notifications, and any other such function related to management of customer profiles and accounts. API server 112 may have one or more processors 162 and one or more API databases 164, which may be any suitable repository of API data. Information stored in API server 122 may be accessed (e.g., retrieved, updated, and added to) via local network 116 and/or network 106 by one or more devices (e.g., the dialogue management device 120) of system 100. In some embodiments, API processor 162 may be used to implement one or more APIs that can access, modify, and retrieve customer account information.

In certain embodiments, real-time APIs consistent with certain disclosed embodiments may use Representational State Transfer (REST) style architecture, and in this scenario, the real-time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, transaction server 114) to exchange data with a server that implements the API (such as, for example, API server 122), in a request-response pattern. In certain embodiments, the request-response pattern defined by the API may be configured in a synchronous fashion, and require that the response be provided in real-time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). Additionally, or alternatively, the client may send GET and POST requests with JSON serialized parameters in the body. Preferably, the requests with JSON serialized parameters use "application/j son" content-type. In another aspect, an API design may also require the server implementing the API return messages in JSON format in response to the request calls from the client.

Natural language processing device (NLP device) 124 may include a computer system configured to receive and process incoming dialogue messages and determine a meaning of the incoming dialogue message. For example, NLP device 124 may be configured to receive and execute a command containing an incoming dialogue message where the command instructs the NLP device 124 to determine the meaning of the incoming dialogue message. NLP device 124 may be configured to continuously or intermittently listen for and receive commands from a command queue to determine if there are any new commands directed to NLP device 124. Upon receiving and processing an incoming dialogue message NLP device 124 may output the meaning of an incoming dialogue message in a format that other devices can process. For example, NLP device 124 may receive an incoming dialogue message stating "Hello, I would like to know my account balance please," and may determine that this statement represents a request for an account balance. NLP device 124 may be configured to output an event representing the meaning of the incoming dialogue message to an event queue for processing by another device. In some embodiments, NLP device 124 may be configured to generate a natural language phrase in response to receiving a command. Accordingly, in some embodiments, NLP device 124 may be configured to output an event that contains data representing natural language dialogue.

NLP device 124 may have one or more processors 172 and one or more NLP databases 174, which may be any suitable repository of NLP data. Information stored in NLP device 124 may be accessed (e.g., retrieved, updated, and added to) via local network 116 and/or network 106 by one or more devices (e.g., the dialogue management device 120) of system 100. In some embodiments, NLP processor 172 may be used to implement an NLP system that can determine the meaning behind a string of text and convert it to a form that can be understood by other devices.

Although the preceding description describes various functions of a web server 110, call center server 112, transaction server 114, dialogue management device 120, database 118, an API server 122, and a natural language processing (NLP) device 124, in some embodiments, some or all of these functions may be carried out by a single computing device.

For ease of discussion, embodiments may be described in connection with the generation of automated natural language dialogue in response to an electronic text communication such as an SMS message, chat program message, or an email. It is to be understood, however, that disclosed embodiments are not limited to dialogue in response to written electronic messages and may be used in many other contexts, such as, for example, generating automated natural language dialogue in response to an oral communication such as a phone call. Further, steps or processes disclosed herein are not limited to being performed in the order described but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter An exemplary embodiment of dialogue management device 120 is shown in more detail in FIG. 2. According to some embodiments, user device 102, web server 110, call center server 112, the transaction server 114, the API server 122, NLP device 124, and third-party server 126 may have a similar structure and components that are similar to those described with respect to dialogue management device 120. As shown, dialogue management device 120 may include a processor 210, an input/output ("I/O") device 220, a memory 230 containing an operating system ("OS") 240 and a program 250. For example, the dialogue management device 120 may be a single server or may be configured as a distributed computer system including multiple servers or computers that interoperate to perform one or more of the processes and functionalities associated with the disclosed embodiments. In some embodiments, the dialogue management device 120 may further include a peripheral interface, a transceiver, a mobile network interface in communication with the processor 210, a bus configured to facilitate communication between the various components of the dialogue management device 120, and a power source configured to power one or more components of the dialogue management device 120.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, or another wide-area or local area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read-only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as, but not limited to, a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Dialogue management device 120 may include one or more storage devices configured to store information used by processor 210 (or other components) to perform certain functions related to the disclosed embodiments. In one example dialogue management device 120 may include memory 230 that includes instructions to enable processor 210 to execute one or more applications, such as server applications, network communication processes, and any other type of application or software known to be available on computer systems. Alternatively, the instructions, application programs, etc. may be stored in external storage or available from a memory over a network. The one or more storage devices may be a volatile or non-volatile, magnetic, semiconductor, tape, optical, removable, non-removable, or another type of storage device or tangible computer-readable medium.

In one embodiment, dialogue management device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, dialogue management device 120 may include memory 230 that may include one or more programs 250 to perform one or more functions of the disclosed embodiments. For example, in some embodiments, dialogue management device 120 may include a rules-based platform (RBP) 290 for generating zero or more commands in response to processing an event, in accordance with a set of predefined rules. In some embodiments, dialogue management device 120 may include a trained machine learning model (MLM) 295 for generating zero or more commands in response to processing an event, in accordance with a model that may be continuously or intermittently updated. Moreover, processor 210 may execute one or more programs 250 located remotely from system 100. For example, system 100 may access one or more remote programs 250 (such as rules-based platform 290 or trained machine learning model 295), that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a customer information database 280 for storing related data to enable dialogue management device 120 to perform one or more of the processes and functionalities associated with the disclosed embodiments. Customer information database 280 may include stored data relating to a customer profile and customer accounts, such as for example, customer identification information (e.g., name, age, sex, birthday, address, VIP status, key customer status, preferences, preferred language, vehicle(s) owned, greeting name, channel, talking points (e.g., favorite sports team), etc.), bank accounts, mortgage loan accounts, car loan accounts, other such accounts, account numbers, authorized users associated with one or more accounts, account balances, account payment history, and other such typical account information. Customer information database may further include stored data relating to previous interactions between the organization 108 (or its related entity) and a customer. For example, customer information database 280 may store customer interaction data that includes records of previous customer service interactions with a customer via a website, SMS, a chat program, a mobile application, an IVR system, or notations taken after speaking with a customer service agent. Customer information database 280 may also include information about business transactions between organization 108 (or its related entity) and a customer that may be obtained from, for example, transaction server 114. Customer information database 280 may also include customer feedback data such as an indication of whether an automated interaction with a customer was successful, online surveys filled out by a customer, surveys answered by a customer following previous interactions to the company, digital feedback provided through websites or mobile application associated with the organization 108 or its related entity (e.g., selecting a smiley face or thumbs up to indicate approval), reviews written by a customer, complaint forms filled out by a customer, information obtained from verbal interactions with customer (e.g., information derived from a transcript of a customer service call with customer that is generated using, for example, voice recognition techniques) or any other types of communications from a customer to organization 108 or its related entity. According to some embodiments, the functions provided by a customer information database may also be provided by a database that is external to the dialogue management device 120, such as database 118.

Memory 230 may also include an event queue 260 for temporarily storing queued events and a command queue 270 for temporarily storing queued commands. Processor 210 may receive events from event queue 260 and in response to processing the event using the rules-based platform 290 and/or the trained machine learning model 295, generate zero or more commands to be output to the command queue 270. According to some embodiments, dialogue management device 120 may place commands in the command queue 270 in the order they are generated. Each command may be designated to be executed by one or more devices, such as, for example, web server 110, call center server 112, the transaction server 114, the API server 122, or NLP device 124. Each such device (such as, for example, the API server 122 or NLP device 124) may continuously or intermittently monitor the command queue 270 to detect commands that are designated to be executed by the monitoring device and may access pertinent commands. The event queue 260 may receive events from other devices, such as, for example, user device 102, web server 110, call center server 112, the transaction server 114, the API server 122, and NLP device 124. According to some embodiments, events may be placed in the event queue 260 in a first-in-first-out (FIFO) order, such that events may then be processed by the dialogue management device 120 in the order they are received or generated.

Dialogue management device 120 may also be communicatively connected to one or more memory devices (e.g., databases) locally or through a network. The remote memory devices may be configured to store information and may be accessed and/or managed by dialogue management device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Dialogue management device 120 may also include one or more I/O devices 220 that may comprise one or more interfaces for receiving signals or input from devices and providing signals or output to one or more devices that allow data to be received and/or transmitted by the dialogue management device 120. For example, dialogue management device 120 may include interface components, which may provide interfaces to one or more input devices, such as one or more keyboards, mouse devices, touch screens, track pads, trackballs, scroll wheels, digital cameras, microphones, sensors, and the like, that enable dialogue management device 120 to receive data from one or more users (such as, for example, via user device 102).

In exemplary embodiments of the disclosed technology, dialogue management device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While dialogue management device 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the dialogue management device 120 may include a greater or lesser number of components than those illustrated.

Figure 3:
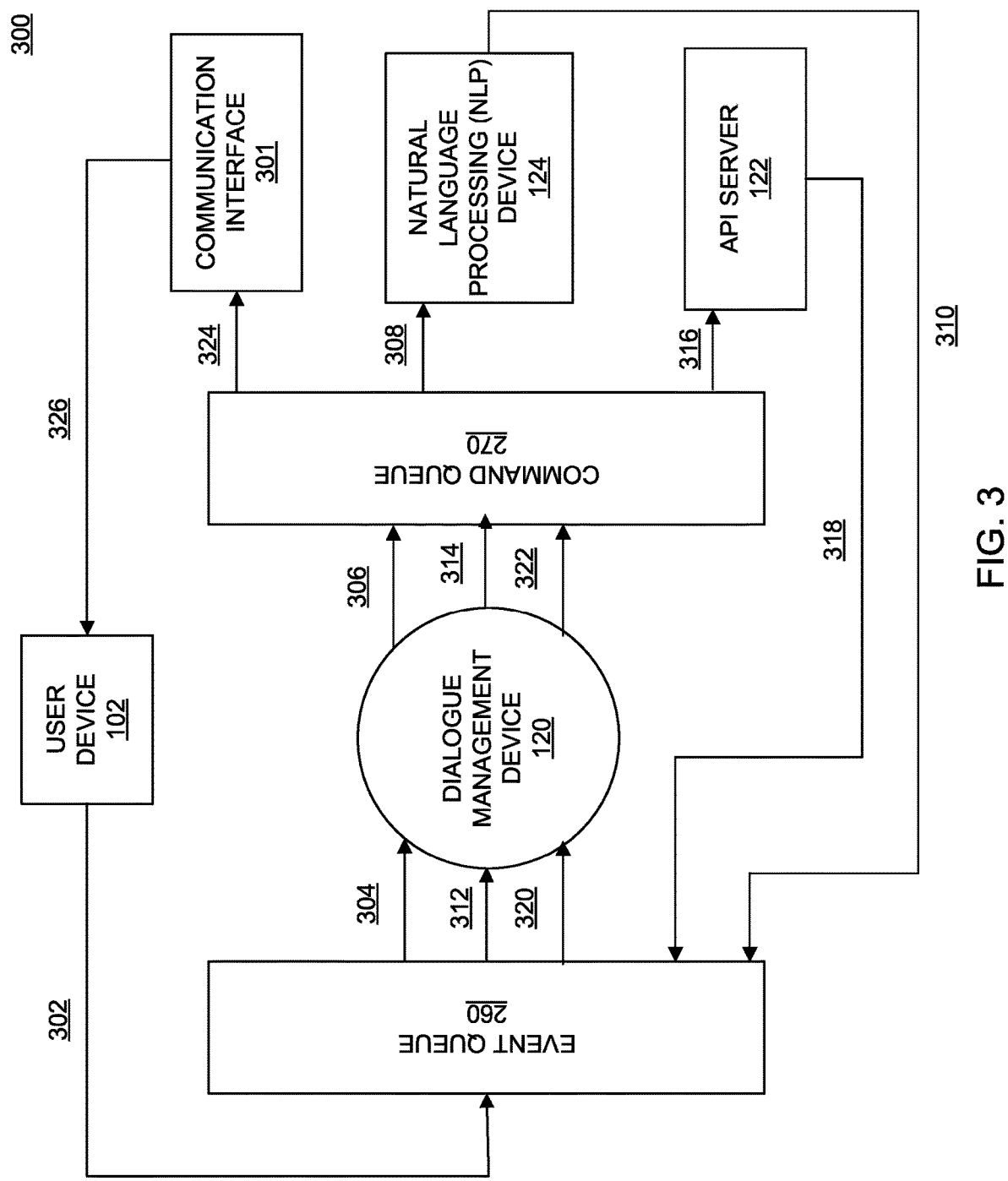
FIG. 3 is a system functionality diagram of an exemplary system for providing automated natural language dialogue.
Figure 4:
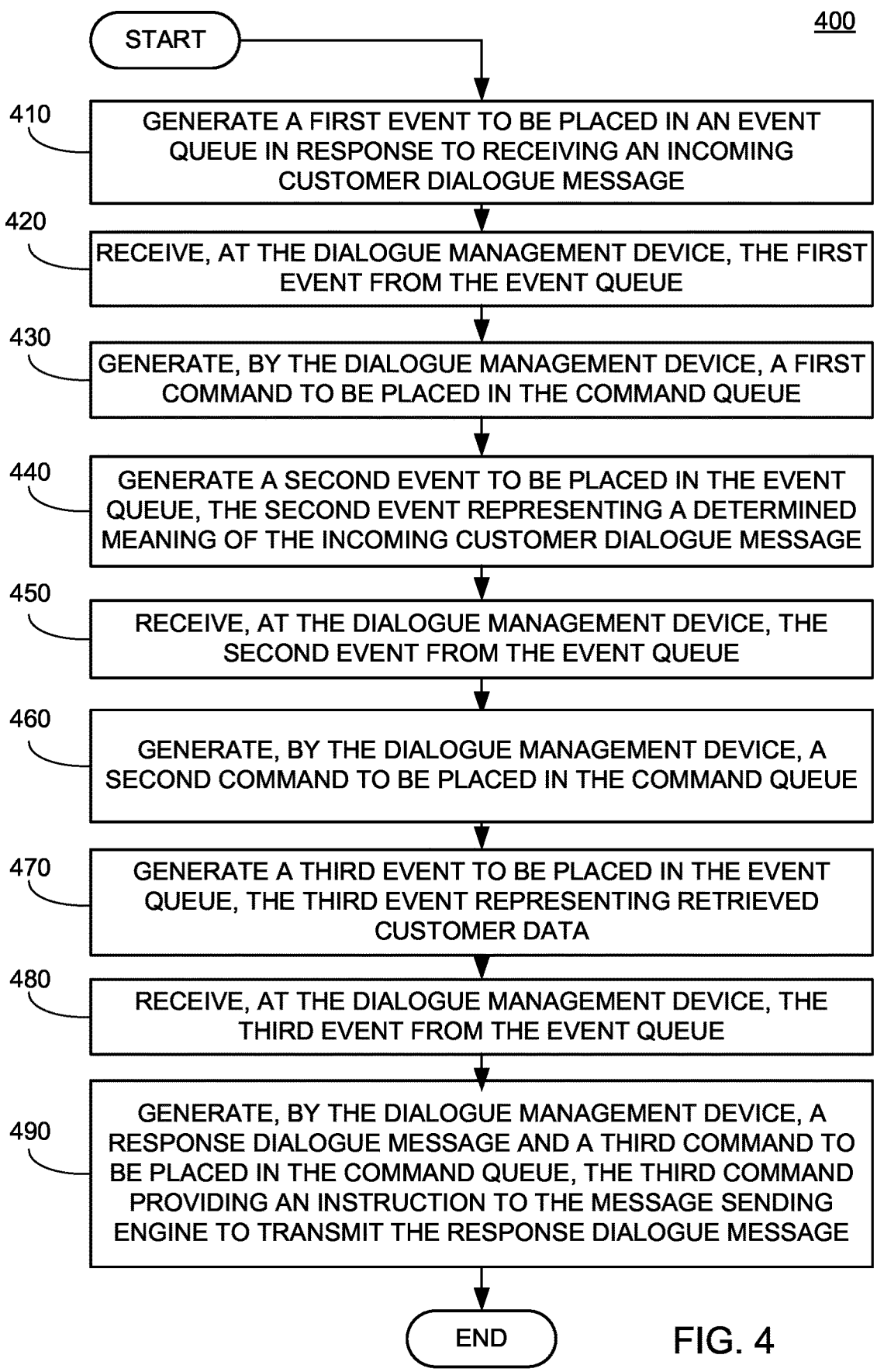
FIG. 4 is a flowchart of an exemplary system for providing automated natural language dialogue.

FIG. 3 shows an exemplary system functionality diagram 300 for a system for providing automated natural language dialogue, and the functionality shown in diagram 300 may be executed by system 100. FIG. 4 shows a flowchart of a method 400 for providing automated natural language dialogue that in some embodiments, may correspond to the system functionality diagram 300 shown in FIG. 3. Method 400 may be performed by dialogue management device 120 using processor 210 to execute memory 230. In some embodiments, steps of method 400 may be delegated to other elements in system 100, such as user device 102, web server 110, call center server 112, the transaction server 114, the API server 122, or natural language processing device 124. Following method 400, the system may generate a response dialogue message that may be transmitted for display at, for example, user device 102.

As shown in FIGS. 3 and 4, at blocks 302 and 410, the system 100 may generate a first event to be placed in the event queue 260 in response to receiving a customer dialogue message. A customer dialogue message may be sent via, for example, user device 102. A customer dialogue message may be sent using various communication mediums, such as for example, SMS, a voice-to-text device, a chat application, an instant messaging application, a mobile application, an IVR system, or any other such medium that may be sufficient to send and receive electronic communications. In some embodiments, the incoming dialogue message may be received by a device of organization 108, such as web server 110, call center server 112, the API server 112 or dialogue management device 120. An event may be generated by, for example, a RESTful API interfacing with the receiving device. After the event is created, it may be placed in the event queue 260. An event queue 260 may be configured to temporarily store a plurality of events. According to some embodiments, events are placed in the event queue in a first-in-first-out (FIFO) manner, such that the events will be executed in the order that they were received. In some embodiments, the event queue 260 and/or the command queue 270 may be part of the dialogue management device 120. In some embodiments, both the event queue 260 and the command queue 270 may be present on a device or component other than dialogue management device 120. For example, in some embodiments, event queue 260 and command queue 270 may be maintained on a cloud server that is accessible by the dialogue management device 120, the API server 122, NLP device 124, and communication interface 301. According to some embodiments, an event may represent different types of information such as, for example, text received from a customer, customer account information, or a request to perform some account-related action. For example, an event might represent a user dialogue message that has been sent to system 100 via SMS that read "Hello, can you please tell me my account balance?" According to some embodiments, an event may have certain metadata associated with it that is sufficient to allow the system to determine the identity of a customer associated with the event and/or a communication medium from which the event originated.

According to some embodiments, the dialogue management device 120 may continuously or intermittently monitor the event queue 260. At blocks 304 and 420, in response to detecting an event (e.g., the first event) in the event queue, the event may be received at the dialogue management device 120 from the event queue 260. In some embodiments, the dialogue management device 120 may include a rules-based platform, a trained machine learning model, and a customer context. According to some embodiments, the customer context may be derived from customer information associated with a particular customer that is stored in a database such as, for example, database 118 or database 280. In some embodiments, the customer information may include one or more of account types, account statuses, transaction history, conversation history, people models, an estimate of customer sentiment, customer goals, and customer social media information. The customer context may allow system 100 to adapt and tailor its responses to a particular customer based on the customer context. According to some embodiments, the customer context may be updated each time the dialogue management device 120 receives a new event from the event queue 260. For example, in some embodiments, the customer context may update by the dialogue management device 120 receiving updated customer information from, for example, database 118.

At blocks 306 and 430, the dialogue management device 120 may, in response to processing the first event, generate a first command to be placed in a command queue 270. According to some embodiments, the dialogue management device 120 may generate a command based on the processed event, the customer context, and using one or more of a rules-based platform 290 and a trained machine learning model 295. For example, in some use cases, a command may be generated using the rules-based platform 290, whereas in other use cases a command may be generated using the trained machine learning model 295, and further use cases may be handled by both working in concert. In some embodiments, the trained machine learning model 295 may be used as a way of enhancing the performance of the rules-based platform 290 by, for example, determining which rules have priority over other rules and what rules should be applied in a given context. According to some embodiments, the commands generated by the dialogue management device 120 in response to a particular event may change as the customer context is updated over time. Further, changes to the rules in the rules-based platform 290 or further training of the machine learning model 295 may also result in different commands being generated in response to the same event. According to some embodiments, the trained machine learning model 295 may be trained by updating a natural language processing device database 174 with communications from customers that have been labeled using, for example, a web user interface. The data in the NLP database 174 may undergo supervised training in a neural network model using a neural network training algorithm while the model is offline before being deployed in the system 100. According to some embodiments, an NLP model of the system 100 may utilize deep learning models such as a convolutional neural network (CNN) that transforms a word into a word vector and long short-term memory (LSTM) that transforms a sequence of word vectors into intent. The NLP model may also be trained to recognize named entities in addition to intents. For example, a named entity may include persons, places, organizations, account types, and product types. According to some embodiments, when the dialogue management device 120 generates a command, such as a first command, it may determine an entity that will execute the command, such as, for example, the API server 122, the NLP device 124, a communication interface 301, or some other device or component, such that only the determined type of entity may pull the command from the command queue 270. For example, in the embodiment shown in FIG. 3, the dialogue management device 120 may determine that the first command is to be executed by the NLP device 124 in order to determine the meaning of the incoming customer dialogue message. According to some embodiments, at the time the dialogue management device 120 creates a new command, the dialogue management device may also update the customer information database 280 (or alternatively, external database 118) with information about a previous or concurrent transaction or customer interaction.

At blocks 308, 310, and 440 the NLP device 124 may receive the first command from the command queue 270, execute the command, and generate a second event to be placed in the event queue 260. According to some embodiments, the NLP device 124 may continuously or intermittently monitor the command queue 270 to detect new commands and upon detecting a new command, may receive the command from the command queue 270. Upon receiving a command, the NLP device 124 may perform various functions depending on the nature of the command. For example, in some cases, NLP device 124 may determine the meaning of an incoming dialogue message in response to executing the command. According to some embodiments, NLP device 124 may determine the meaning of an incoming dialogue message by utilizing one or more of the following artificial intelligence techniques: intent classification, named entity recognition, sentiment analysis, relation extraction, semantic role labeling, question analysis, rule extraction, and discovery, and story understanding. Intent classification may include mapping text, audio, video, or other media into an intent chosen from a set of intents, which represent what a customer is stating, requesting, commanding, asking, or promising, in for example an incoming customer dialogue message. Intent classifications may include, for example, a request for an account balance, a request to activate a credit/debit card, an indication of satisfaction, a request to transfer funds, or any other intent a customer may have in communicating a message. Named entity recognition may involve identifying named entities such as persons, places, organizations, account types, and product types in text, audio, video, or other media. Sentiment analysis may involve mapping text, audio, video, or other media into an emotion chosen from a set of emotions. For example, a set of emotions may include positive, negative, anger, anticipation, disgust, distrust, fear, happiness, joy, sadness, surprise, and/or trust. Relation extraction may involve identifying relations between one or more named entities in text, audio, video, or other media. A relation may be, for example, a "customer of" relation that indicates that a person is a customer of an organization. Semantic role labeling may involve identifying predicates along with roles that participants play in text, audio, video, or other media. An example of semantic role labeling may be identifying (1) the predicate Eat, (2) Tim, who plays the role of Agent, and (3) orange, which plays the role of Patient, in the sentence "Tim ate the orange." Question analysis may involve performing natural language analysis on a question, including syntactic parsing, intent classification, semantic role labeling, relation extraction, information extraction, classifying the type of question, and identifying what type of entity is being requested. Rule extraction and discovery may involve extracting general inference rules in text, audio, video, or other media. An example of rule extraction may be extracting the rule that "When a person turns on a light, the light will light up" from "Matt turned on the light, but it didn't light up." Story understanding may involve taking a story and identifying story elements including (1) events, processes, and states, (2) goals, plans, intentions, needs, emotions, and moods of the speaker and characters in the story, (3) situations and scripts, and (4) themes, morals, and the point of the story.

In some cases, NLP device 124 may perform natural language generation in response to receiving a command. According to some embodiments, NLP device 124 may perform natural language generation by utilizing one or more of the following artificial intelligence techniques: content determination, discourse structuring, referring expression generation, lexicalization, linguistic realization, explanation generation. The content determination may involve deciding what content to present to the customer out of all the content that might be relevant. Discourse structuring may involve determining the order and level of detail in which content is expressed. Referring expression generation may involve generating expressions that refer to entities previously mentioned in a dialogue. Lexicalization may involve deciding what words and phrases to use to express a concept. The linguistic realization may involve determining what linguistic structures, such as grammatical constructions, to use to express an idea. Explanation generation may involve generating a humanly-understandable, transparent explanation of a conclusion, chain of reasoning, or result of a machine learning model. In the exemplary embodiment shown in FIG. 3, the NLP device 124 may determine the meaning of the incoming customer dialogue message and converts it to a form that may be processed by the dialogue management device 120. Accordingly, the second event generated by the NLP device 124 may represent a determined meaning of the incoming customer dialogue message and the NLP device 124 may send the second event to the event queue 260.

At blocks 312 and 450, the dialogue management device 120 may receive the second event from the event queue 260 in response to detecting it as described above with respect to dialogue management device's 120 receipt of the first event. In some embodiments, dialogue management device 120 may also update the customer context at this point by receiving updated customer information from, for example, database 118. At blocks 314 and 460, the dialogue management device 120 may, in response to processing the second event, generate a second command to be placed in a command queue 270. According to some embodiments, dialogue management device 120 may generate the second command based on the processed event, the customer context, and using one or more of a rules-based platform 290 and a trained machine learning model 295 as described above. In the exemplary embodiment shown in FIG. 3, the second event may represent a customer's request to know, for example, their account balance. Based on the customer context, rules-based platform 290 and/or trained machine learning model 295, dialogue management device 120 may decide, for example, using predictive analytics that it has enough information to create a second event that represents instructions to an API associated with the API server 122 to look up the customer's account balance. However, in some embodiments, dialogue management device 120 may decide that, for example, it is too uncertain as to which account the customer is seeking information about and may instead create a second event that represents instructions to communication interface 301 to send a message to user device 102 requesting more information. Accordingly, based on the customer context, rules-based platform 290, and trained machine learning model 295, dialogue management device 120 may change or adapt its responses to a given request over time.

At blocks 314 and 460, the dialogue management device 120 may, in response to processing the second event, generate a second command to be placed in command queue 270. According to some embodiments, dialogue management device 120 may generate the second command based on the processed event, the customer context, and using one or more of rules-based platform 290 and trained machine learning model 295 in a fashion similar to the generation of the first command described above. According to some embodiments, the second command may represent a command to API server 122 to retrieve customer information, such as, for example, the account balance information.

In some embodiments, at blocks 316, 318, and 470, API server 122 may receive the second command from the command queue 270, execute the command, and generate a third event to be placed in event queue 260. According to some embodiments, the API server 122 may continuously or intermittently monitor the command queue 270 to detect new commands and upon detecting a new command, may receive the command from the command queue 270. Upon receiving a command, API server 122 may perform various functions depending on the nature of the command. For example, in some cases, API server 122 call up an API stored locally or remotely on another device, to retrieve customer data (e.g., retrieve an account balance), perform an account action (e.g., make a payment on a customer account), authenticate a customer (e.g., verify customer credentials), or execute an opt-in/opt-out command (e.g., change account to opt-in to paperless notifications). Accordingly, in some embodiments, the third event may represent, for example, a retrieved account balance, an acknowledgment of the performance of an account action, an acknowledgment of the execution of an opt-in/opt-out command, or verification or denial of a customer's credentials.

At blocks 320 and 480, the dialogue management device 120 may receive the third event from the event queue 260 in response to detecting it as described above. In some embodiments, dialogue management device 120 may also update the customer context at this point by receiving updated customer information from, for example, database 118.

At blocks 322 and 490, the dialogue management device 120 may, in response to processing the third event, generate a third command to be placed in command queue 270. According to some embodiments, dialogue management device 120 may generate the third command based on the processed third event, the customer context, and using one or more of rules-based platform 290 and trained machine learning model 295 in a fashion similar to the generation of the first command described above. In some embodiments, dialogue management device 120 may also generate a response dialogue message in response to processing an event, such as the third event. In some embodiments, dialogue management device 120 may receive a response dialogue message as an event produced by NLP device 124. According to some embodiments, the third command may represent a command or instruction to communication interface 301 to transmit the response dialogue message to, for example, user device 102.

Figure 2:
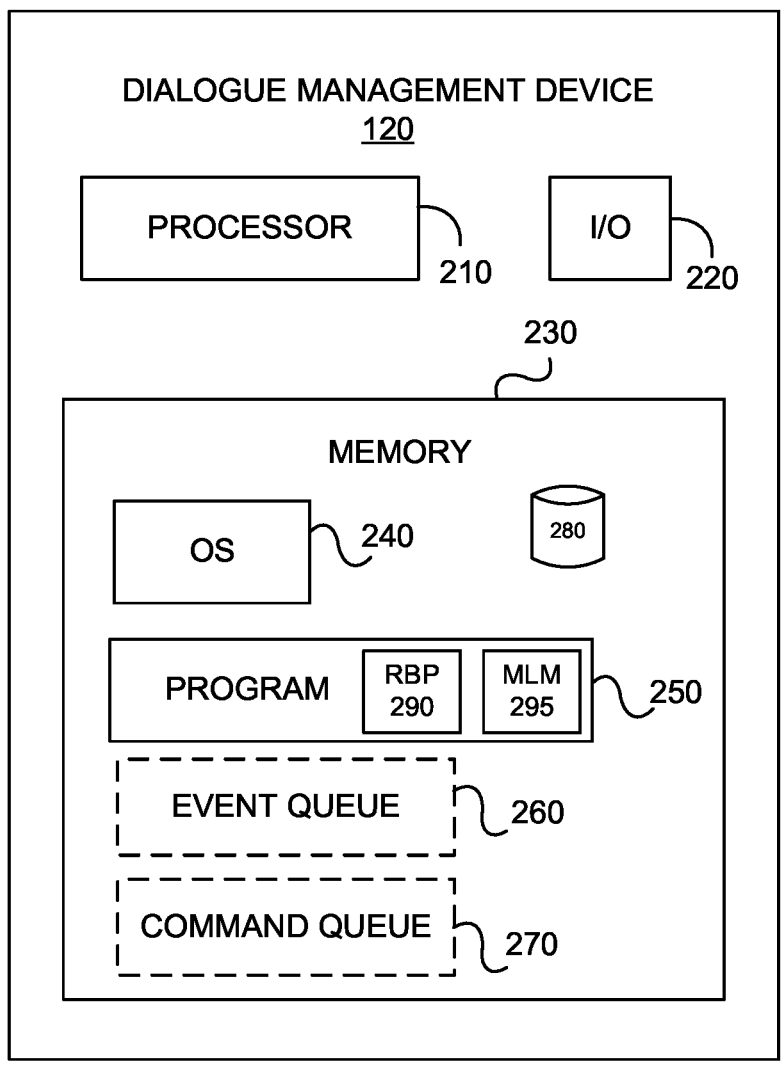
FIG. 2 is a component diagram of an exemplary dialogue management device.

At blocks 324 and 326, the communication interface 301 may receive and execute the third command, which may cause the communication interface 301 to transmit (e.g., via SMS) the response dialogue message to user device 102. In some embodiments, communication interface 301 may continuously or intermittently monitor command queue 270 for new commands and may receive the third command in response to detecting the third command in command queue 270. According to some embodiments, communication interface 301 may be a standalone device having some or all of the elements of dialogue management device 120 as shown in FIG. 2. In some embodiments, communication interface 301 may be integrated into dialogue management device 120 (e.g., as I/O device 220). In some embodiments, communication interface 301 may be integrated into another device, such as, for example, web server 110, call center server 112, the transaction server 114, the API server 122, or NLP server 124.

As shown in the exemplary embodiments in FIGS. 3 and 4, a system (e.g., system 100) for automating natural language dialogue with a customer may utilize the structure provided by the event queue 260, dialogue management device 120, command queue 270, API server 122, NLP server 124, and communication interface 301 to adaptively respond to customer messages to leverage artificial intelligence in the machine learning models and natural language processing device to adaptively respond to customer communications using natural language. Further, the use of a repeatedly updating customer context provides the system 100 with the ability to customize responses to individual customers and adapt the responses over time. The use of artificial intelligence and machine-learning by the NLP device 124, and a repeatedly updating customer context maintained by the dialogue management device 120, the system enables the non-deterministic conversational responses to customer utterances (i.e., customer dialogue messages) that are adaptive and customized. Further, according to some embodiments, the system 100 may consumption of events and creation of commands by the dialogue management device 120 may occur asynchronously. Further, while FIG. 3 and the related description appear to show a particular single cycle of events, it should be appreciated that multiple different cycles of events may be processed in parallel by the dialogue management device 120.

In some embodiments, the trained machine learning model 295 may include a people model that serves to estimate a customer's mindset per use case, over time. For example, the people model may estimate how stressed out a customer is and determine, for example, how fast they want to conduct a transaction or interaction. The trained machine learning model 295 may include a relevance measure that may quantitatively assess how relevant a particular conversation with a customer is based on the percent of task completion and rate of return conversations. The trained machine learning model 295 may include an affect recognition functionality that seeks to recognize a customer's emotions based on facial expressions, audio speech signals, images, gestures, blood pressure, heart rate, or other such customer data that may be collected by a user device 102 and transmitted to the system 100. In some embodiments, the trained machine learning model 295 may include payment and financial planning features that model risk factors, savings, and spending patterns over time. In some embodiments, the trained machine learning module 295 may include observations of the accuracy and effectiveness of the automated natural language interactions by tracking business metrics over time, such as for example, a reduction in call center volume over a period of time. In some embodiments, the trained machine learning module 295 may enable the execution of hypothesis-driven micro-experiments that enable the system to test a model hypothesis on a small population of users to validate whether the hypotheses are valid or not.

In some embodiments, due to system architecture that allows API server 122, NLP device 124, communication interface 301 to operate independently from one another by separately pulling commands from the command queue 270, the system provides the advantage of asynchronous operation of the system. Accordingly, the entire system is stateless and there are no side effects to calling a particular function.

Figure 5:
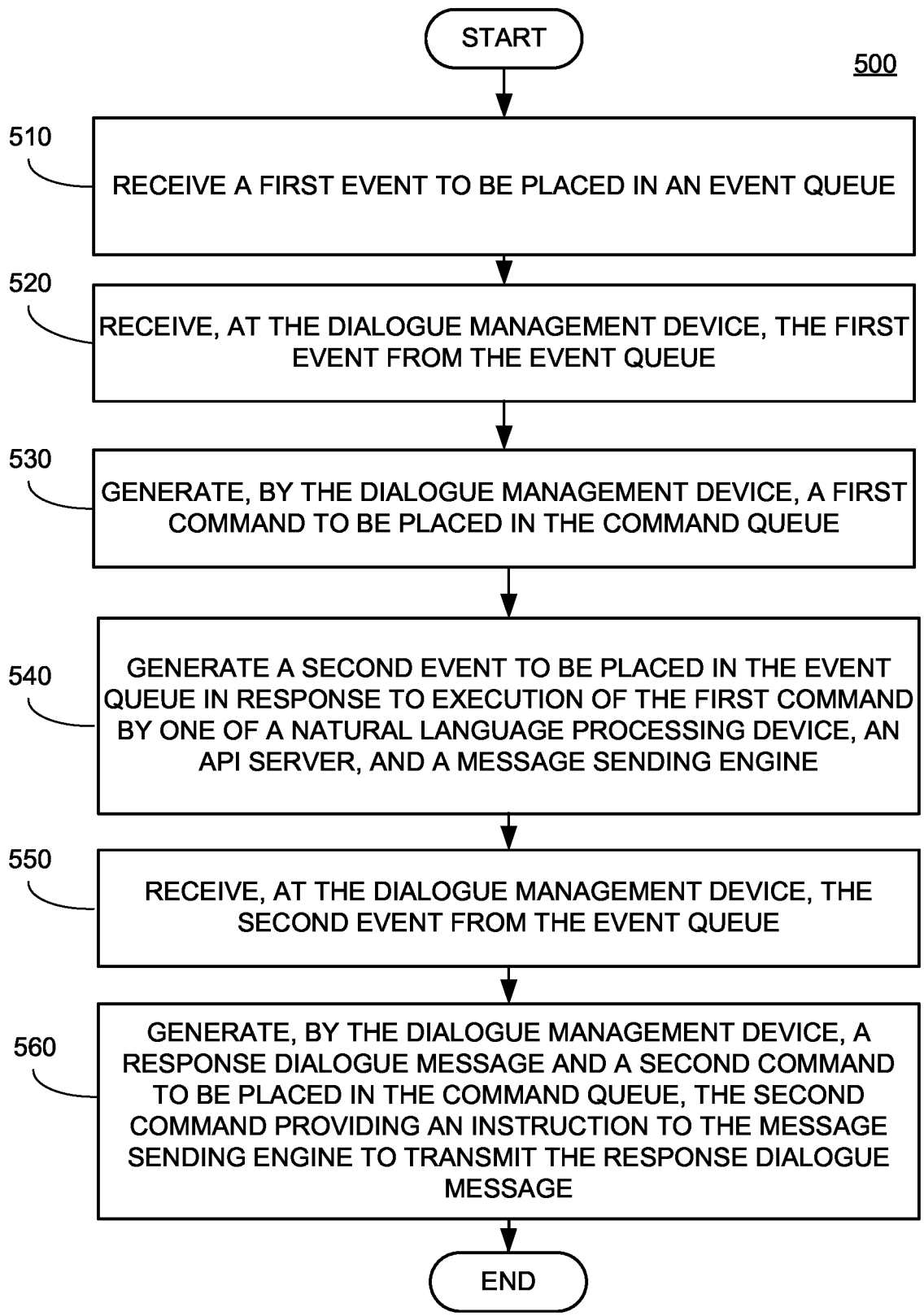
FIG. 5 is a flowchart of another exemplary system for providing automated natural language dialogue.

FIG. 5 shows a flowchart of an exemplary method 500 for providing automated natural language dialogue. Method 500 may be performed by dialogue management device 120 using processor 210 to execute memory 230. In some embodiments, steps of method 500 may be delegated to other elements in system 100, such as user device 102, web server 110, call center server 112, the transaction server 114, the API server 122, or natural language processing device 124. Following method 500, the system may generate a response dialogue message that may be transmitted for display at, for example, user device 102.

In block 510, system 100 may receive a first event to be placed in an event queue. In some embodiments, a first event may be received from, for example, a user device as described above with respect to FIG. 4. In some embodiments, a first event may be received from API server 122, NLP device 124, communication interface 301, or any other such device or component capable of generating events. According to some embodiments, an event may represent the occurrence of some action, such as the receipt of a message, receipt of a request, retrieval of customer information, acknowledgement of a change to a customer's account, verification or denial of a customer's credentials, or any other such information that may be used to maintain and administer customer accounts. In some embodiments, the first event may include data representative of an incoming dialogue message.

In block 520, in response to detecting an event in the event queue, the event may be received at the dialogue management device 120 from the event queue 260. As described above with respect to FIG. 4, in some embodiments, the dialogue management device 120 may include a rules-based platform, a trained machine learning model, and a customer context. According to some embodiments, the customer context may be derived from customer information associated with a particular customer stored in a database, such as for example, database 118. In some embodiments, the customer information may include one or more account types, account statuses, transaction history, conversation history, people models, an estimate of customer sentiment, customer goals, and customer social media information.

In block 530, the dialogue management device 120 may, in response to processing the first event, generate a first command to be placed in command queue 270. According to some embodiments and as described above with respect to FIG. 4, dialogue management device 120 may generate a command based on the processed event, the customer context, and using a trained machine learning model 295. According to some embodiments, when dialogue management device 120 generates a command, such as a first command, it may determine an entity that will execute the command, such as, for example, API server 122, NLP device 124, communication interface 301, or some other device or component, such that only the determined type of entity may pull the command from command queue 270. In some embodiments, the first command may be an instruction to NLP device 124 to determine the meaning of an incoming customer dialogue message. In some embodiments, the first command may be a command to retrieve customer data, a command to perform an account action, a command to authenticate a customer, or an opt-in/opt-out command.

In block 540, the NLP device 124 or the API server 122 may receive the first command from the command queue 270, execute the command, and generate a second event to be placed in event queue 260 in a fashion similar to the examples described above with respect to FIG. 4.

In block 550, in response to detecting the second event in event queue 260, the second event may be received at the dialogue management device 120 from event queue 260. In some embodiments, as described previously, the dialogue management device 120 may also generate or receive an updated customer context in response to receiving the second event from the event queue 260.

In block 560, the dialogue management device 120 may, in response to processing the second event, generate a second command to be placed in command queue 270 and a response dialogue message. According to some embodiments, dialogue management device 120 may generate the second command and the response dialogue message based on the processed second event, the customer context, and using one or more of rules-based platform 290 and trained machine learning model 295 in a fashion similar to the generation of the first command described above. According to some embodiments, the second command may represent a command or instruction to communication interface 301 to transmit the response dialogue message to, for example, user device 102.

According to some embodiments of method 500, the customer context may be updated each time dialogue management device 120 receives an event from the event queue 260. For example, the customer context may be updated by receiving updated customer information from a database, such as a database 118. In some embodiments, the database storing the customer information (e.g., database 118) may be updated to store new information regarding customer interactions. For example, according to some embodiments, method 500 may further include the step of outputting a record of a customer interaction relating to a command to a database storing the customer information, after the command is generated by dialogue management device 120.

According to embodiments of the present disclosure, NLP device 124 may be capable of determining the meaning of an incoming customer dialogue message by utilizing one or more artificial intelligence techniques, including intent classification, named entity recognition, sentiment analysis, relation extraction, semantic role labeling, question analysis, rule extraction, and discovery, and story understanding, as described previously above. Further, in some embodiments, the NLP device 124 may be capable of performing natural language generation by utilizing one or more artificial intelligence techniques, such as content determination, discourse structuring, referring expression generation, lexicalization, linguistic realization, explanation generation, as described previously above.

As used in this application, the terms "component," "module," "system," "server," "processor," "memory," and the like are intended to include one or more computer-related units, such as but not limited to hardware, firmware, a combination of hardware and software, software, or software in execution. For example, a component may be but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes one example of a typical user flow pattern. It is intended solely for explanatory purposes and not in limitation. A customer may have a question or request to make of an entity related to an organization (e.g., organization 108), such as, for example, asking about an account balance or requesting to make a payment. The customer may send a text message (e.g., via user device 102) including the statement "Hello, can you please tell me my account balance?" to a number associated with the organization, which may be received by the organization (e.g., via web server 110). The system may then process the message to understand its meaning (e.g., via NLP server 124) and make a determination about how to respond (e.g., via dialogue management device 120). In the process of making the determination about how to respond, the system (e.g., via dialogue management device 120) may consider the customer context of the user. For example, the system may analyze all of the currently known data about the customer, such as the customer's account information, all of the previous interactions with the customer, the customer's goals, the customer's social media presence, and an estimation of the customer's emotional state to make a determination about how to respond. In doing so, the system (e.g., via dialogue management device 120) may decide, for example, that based on previous requests, the customer is requesting information about a checking account, and therefore may decide to respond (e.g., via communication interface 301) with the customer's checking account information. In another instance, the system (e.g., via dialogue management device 120) may decide that it does not have enough information to determine which account the customer is referring to and may send a message to the customer requesting more information. Further, the system (e.g., via NLP device 124) may customize the form of the response to the customer based on observations about the customer's speech patterns.

Another use case involves the system (e.g., via dialogue management device 120) proactively providing a customer with unrequested information based on a predictive analysis of the customer's needs. Such predictive analysis can be conducted (e.g., via dialogue management device 120) using machine learning and modeling in conjunction with knowledge of the customer context. For example, a customer may send the system a message requesting a change in automatic bill payments in addition to making the requested change (e.g., via API server 122) the system may decide to send a message to the customer to remind them that they have a bill coming due soon, despite the fact that the customer did not request that information. In this way, the system can take proactive steps to meet a customer's needs.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

We claim:

1. A system for automating natural language dialogue with a customer, comprising:
   one or more processors; and
   memory in communication with the one or more processors and storing instructions that, when executed by the one or more processors, are configured to cause the system to:
   responsive to receiving an incoming customer dialogue message via an automated dialogue interaction channel, generate an event to be placed in an event queue, the event queue being monitored by a dialogue management device;
   responsive to processing the event and based on data indicative of a customer context, the data derived from customer interaction history information, generate, by the dialogue management device, a command to a natural language processing device to determine a meaning of the incoming customer dialogue message based on the customer context;
   responsive to an execution of the command by the natural language processing device, retrieving customer data; and
   responsive to processing the customer data, generate, by the dialogue management device and based on the customer context, a response dialogue message based at least in part on retrieved customer data as processed by the dialog management device.

2. The system of claim 1, wherein the response dialog message comprises unrequested information based on a predictive analysis of one or more determined needs of the customer.

3. The system of claim 1 wherein the event comprises an indication that the incoming customer dialogue message was received via one of the following types of channels: SMS, an instant messaging program, a website-based chat program, a mobile application, a voice-to-text device, or an email.

4. The system of claim 3 wherein the dialogue management device generates the response dialogue message based on a type of channel the incoming customer dialogue message was received on.

5. The system of claim 1 wherein the customer context is further derived from customer information associated with a particular customer stored in a database, the customer information comprising one or more of: account types, account statuses, transaction history, people models, an estimate of customer sentiment, customer goals, and customer social media information.

6. The system of claim 5 wherein the customer context is updated each time the dialogue management device receives an event.

7. A system for automating natural language dialogue with a customer, comprising:
   one or more processors; and
   memory in communication with the one or more processors and storing instructions that, when executed by the one or more processors, are configured to cause the system to:
   responsive to receiving an incoming customer dialogue message via an automated dialogue interaction channel, generate an event to be placed in an event queue, the event queue being monitored by a dialogue management device, the dialogue management device comprising a trained machine learning model;
   responsive to processing the event and based on data indicative of a customer context, the data derived from customer interaction history information, determining a meaning of the incoming customer dialogue message based on the customer context;
   responsive to determining the meaning of the incoming customer dialogue message, generate, by the dialogue management device and based on one or more of trained machine learning model or the customer context, a response dialogue message based at least in part on retrieved customer data as processed by the dialog management device; and
   transmit the response dialogue message via a communication channel that was used to deliver the incoming customer dialogue message.

8. The system of claim 7, wherein the event queue comprises one or more events for processing by one or more of a natural language processing device, an API server, or a communication interface.

9. The system of claim 8, wherein the event causes to the natural language processing device to determine the meaning of the incoming customer dialogue message.

10. The system of claim 7, wherein the event initiates one or more of: retrieval of customer data, account action, customer authentication, or an opt-in/opt-out process.

11. The system of claim 7 wherein the customer context is further derived from customer information, the customer information comprising one or more of: account types, account statuses, transaction history, people models, an estimate of customer sentiment, customer goals, or customer social media information.

12. The system of claim 11 wherein the customer context is updated each time the dialogue management device receives an event.

13. The system of claim 12 wherein the customer context is updated by receiving updated customer information.

14. The system of claim 12, further comprising outputting, from the dialogue management device, a record of a customer interaction related to the event.

15. The system of claim 8, wherein the natural language processing device determines the meaning of an incoming customer dialogue message by utilizing one or more of the following artificial intelligence techniques: intent classification, named entity recognition, sentiment analysis, relation extraction, semantic role labeling, question analysis, rule extraction and discovery, or story understanding.

16. The system of claim 8, wherein the natural language processing device generates natural language by utilizing one or more of the following artificial intelligence techniques: content determination, discourse structuring, referring expression generation, lexicalization, linguistic realization, or explanation generation.

17. A method for providing automated natural language dialogue with a customer, comprising:
   receiving an event to be placed in an event queue, the event queue being monitored by a dialogue management device via an automated dialogue interaction channel, the dialogue management device comprising a trained machine learning model;
   responsive to processing the event and based on data indicative of a customer context comprising data derived from customer interaction history information, generating, by the dialogue management device, one or more commands for execution by one or more of a natural language processing device, an API server, or a communication interface;
   determining a meaning of an incoming customer dialogue message based on the customer context; and
   generating, by the dialogue management device and based on one or more of the trained machine learning model or the customer context, a response dialogue message based at least in part on retrieved customer data.

18. The method of claim 17, wherein the response dialog message comprises unrequested information based on a predictive analysis of one or more determined needs of the customer.

19. The method of claim 17, wherein the one or more commands comprise a command to the natural language processing device to determine the meaning of the incoming customer dialogue message.

20. The method of claim 17, wherein the customer context is further derived from customer information, the customer information comprising one or more of: account types, account statuses, transaction history, people models, an estimate of customer sentiment, customer goals, or customer social media information.

* * * * *